United States Patent [19]

Oates

[11] Patent Number: 4,829,136

[45] Date of Patent: May 9, 1989

[54] COMPOSITIONS FOR PRODUCING POLYMERS OF HIGH REFRACTIVE INDEX

[75] Inventor: Stephanie J. Oates, Wadsworth, Ohio

[73] Assignee: PPG Industries, Inc., Pittsburgh, Pa.

[21] Appl. No.: 194,056

[22] Filed: May 13, 1988

[51] Int. Cl.$^4$ .............................................. C08F 4/36
[52] U.S. Cl. .............................. 526/230.5; 526/232.1; 526/314; 558/268
[58] Field of Search .................. 526/314, 232.1, 230.5; 558/268

[56] References Cited

U.S. PATENT DOCUMENTS

| | | | |
|---|---|---|---|
| 2,370,567 | 2/1945 | Muskat et al. | 260/463 |
| 2,403,113 | 7/1946 | Muskat et al. | 260/78 |
| 2,455,652 | 12/1948 | Bralley et al. | 260/77.5 |
| 2,455,653 | 12/1948 | Bralley et al. | 260/77.5 |
| 2,587,437 | 2/1952 | Bralley et al. | 260/77.5 |
| 4,530,747 | 7/1985 | Donges et al. | 204/159.16 |
| 4,622,376 | 11/1986 | Misura et al. | 526/286 |
| 4,666,976 | 5/1987 | Misura | 524/739 |
| 4,742,133 | 5/1988 | Tang et al. | 526/236 |
| 4,746,716 | 5/1988 | Oates | 526/314 |
| 4,757,129 | 7/1988 | Oates | 526/286 |

FOREIGN PATENT DOCUMENTS

| | | | |
|---|---|---|---|
| 538729 | 3/1957 | Canada | 526/314 |
| 0144782 | 6/1985 | European Pat. Off. | |
| 1264353 | 2/1972 | United Kingdom. | |

*Primary Examiner*—C. Warren Ivy
*Assistant Examiner*—Alex H. Walker
*Attorney, Agent, or Firm*—George D. Morris

[57] ABSTRACT

Polymerizable compositions comprising 4,4'(1-phenylethylidene)bis[phenol] bis(allyl carbonate) monomer or prepolymer are useful for preparing polymerizates of high refractive index.

29 Claims, No Drawings

COMPOSITIONS FOR PRODUCING POLYMERS OF HIGH REFRACTIVE INDEX

Aliphatic polyol poly(allyl carbonate) monomer, most notably diethylene glycol bis(allyl carbonate), has for many years been used in producing ophthalmic lenses. Such lenses exhibit substantial hardness and refractive indices that are sufficient for many, if not most, ophthalmic applications. There is a need, however, for polymeric lenses of higher refractive indices than those ordinarily provided by polymers of aliphatic polyol poly(allyl carbonate).

This need centers around the desire to reduce the volume of material required to produce a lense of given size, minimum thickness, and optical correction, which volumetric reduction can be achieved through use of polymeric materials having higher refractive indices. It is known that polymers formed from bisphenol bis(allylic carbonate)-functional monomer often have higher refractive indices than those formed from aliphatic polyol poly(allyl carbonate) monomer. Some bisphenol bis(allylic carbonate)-functional monomers, however, are capable of producing polymers of higher refractive indices than others. High refractive index is not the only criterion, however. The polymer must also possess other physical properties which render it satisfactory for ophthalmic lenses. Among such physical properties are acceptable hardness and, for most ophthalmic applications, acceptably low yellowness. Some bisphenol bis(allylic carbonate)-functional monomers are capable of producing polymers of high refractive indices, but the polymers fail to exhibit one or more other satisfactory physical properties. The search for those bisphenol bis(allylic carbonate)-functional monomers capable of producing polymers exhibiting higher than usual refractive indices and other satisfactory physical properties therefore continues.

THE INVENTION

A bisphenol bis(allylic carbonate)-functional monomer has now been discovered which is capable of producing polymers of high refractive indices and other physical properties satisfactory for ophthalmic purposes.

Accordingly, one embodiment of the invention is 4,4'-(1-phenylethylidene)bis[phenol] bis(allyl carbonate).

Another embodiment of the invention is polymerizable, homogeneous composition comprising bisphenol bis(allylic carbonate)-functional material comprising (a) 4,4-(1-phenylethylidene)bis[phenol]bis(allyl carbonate) monomer, (b) prepolymer of such monomer, or (c) a mixture thereof.

Yet another embodiment of the invention is polymerizate produced by free-radically polymerizing the polymerizable, homogenous composition of the second embodiment, which polymerizate has a 15-second Barcol hardness of at least about 15 and a refractive index at 20° C. and a wavelength of 589.3 nanometers of at least about 1.57.

The procedures by which the 4,4'-(1-phenylethylidene)bis[phenol] bis(allyl carbonate) monomer can be prepared are similar to those known for the preparation of other bisphenol bis(allylic carbonate) monomers. See, for example, U.S. Pat. Nos. 2,455,652; 2,455,653; and 2,587,437 the disclosures of which are, in their entireties, incorporated herein by reference. In one method, allyl alcohol [CAS 107-18-6] is reacted with phosgene [CAS 75-44-5] to form allyl chloroformate [CAS 2937-50-0] which is then reacted with 4,4'-(1-phenylethylidene)bis[phenol] [CAS 1571-75-1]. In another method, 4,4'-(1-phenylethylidene)bis[phenol] is reacted with phosgene to form 1-phenylethylidenebis(4,1-phenylene)bis(chloroformate) [CAS 1885-21-8] which is then reacted with allyl alcohol. In a third method, 4,4'-(1-phenylethylidene)bis[phenol], allyl alcohol, and phosgene are mixed together and reacted. In all of these reactions the proportions of reactants are approximately stoichiometric, except that phosgene may be used in substantial excess if desired. The temperatures of the chloroformate-forming reactions are preferably below about 100° C. in order to minimize the formation of undesirable by-products. Ordinarily the temperature of the chloroformate-forming reaction is in the range of from about 0° C. to about 20° C. The carbonate-forming reaction is usually conducted at about the same temperatures, although higher temperatures may be employed. Suitable acid acceptors, e.g., pyridine, a tertiary amine, an alkali metal hydroxide, or an alkaline earth metal hydroxide may be employed when desired. The reactions are usually liquid phase reactions. Extrinsic solvent may be used when desirable or when necessary to solubilize one or more of the reactants. Examples of suitable extrinsic solvents that may be used include benzene, toluene, xylene, chlorobenzene, o-dichlorobenzene, o-chlorotoluene, acetone, methylene chloride, chloroform, perchloroethylene, trichloroethylene, and carbon tetrachloride. The pressure at which the reactions are conducted may vary widely, but usually they are at about ambient pressure or a little higher depending upon the pressure drop through the equipment.

The 4,4'-(1-phenylethylidene)bis[phenol] bis(allyl carbonate) monomer contains 4,4'-(1-phenylethylidene)bis[phenol] bis(allyl carbonate) represented by Formula (I):

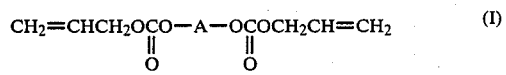

where A is represented by Formula (II)

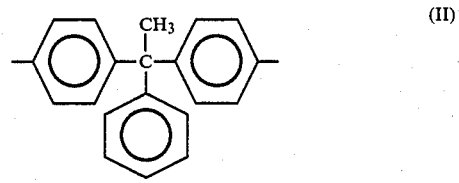

Because of the processes by which the 4,4'-(1-phenylethylidene)bis [phenol]]bis(allyl carbonate) monomer is made, the essentially solvent-free final reaction product can and usually does contain one or more related compounds. Individual species of the principal classes of related compounds can be represented by any of Formulae (III), (IV), or (V):

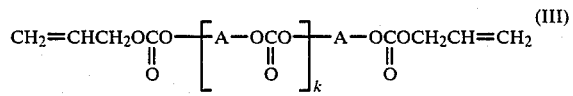

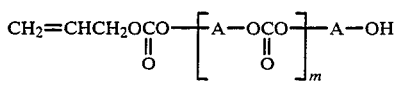

(IV)

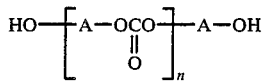

(V)

wherein A is represented by Formula (II), k is an integer in the range of from 1 to about 4, m is an integer in the range of from 0 to about 4, and n is an integer in the range of from 0 to about 4.

The product may be purified so as to contain essentially no related compounds, but this is rarely done. Although the product may contain only a single related compound, it usually contains a mixture of different related compounds. Typically all of the related compounds taken together constitute from about 1 to about 5 weight percent of the product.

The bisphenol poly(allylic carbonate)-functional prepolymer which is useful in the practice of the present invention is prepared by partially polymerizing 4,4'-(1-phenylethylidene)bis[phenol] bis(allyl carbonate) monomer to utilize a fraction of the allylic groups without incurring significant gellation. The preferred bisphenol poly(allylic carbonate)-functional prepolymers are those prepared in accordance with the general procedures described in detail in European Patent Publication No. 0 144 782 A2 and in U.S. application Ser. No. 24,878, filed Mar. 12, 1987, the entire disclosures of which are incorporated herein by reference.

In accordance with the methods of European Patent Publication No. 0 144 782 A2 and U.S. application Ser. No. 24,878, bisphenol bis(allylic carbonate)-functional monomer is dissolved in a solvent in which the polymer produced from such monomer is also soluble. Preferably, the initiator used to conduct the polymerization is also soluble in the solvent. The resulting liquid solution comprising bisphenol bis(allylic carbonate)-functional monomer, solvent, and preferably initiator is then partially polymerized, e.g., by heating the liquid solution to polymerization temperatures. The polymerization reaction is allowed to continue until more than 12 percent allylic utilization is attained, i.e., until more than 12 percent of the unsaturated carbon—carbon linkages in the monomer are consumed. The degree of allylic utilization can be controlled by regulating the amount of initiator added to the liquid solution, the temperature at which the partial polymerization is performed, and the ratio of solvent to bisphenol bis(allylic carbonate)-functional monomer. Generally, the greater the amount of initiator used, the higher is the allylic utilization. The higher the temperature of polymerization, the lower is the degree of allylic utilization. At constant temperature and employing a given amount of initiator, the higher the ratio of solvent to monomer, the lower is the degree of allylic utilization. Ordinarily however, if at constant temperature the ratio of solvent to monomer is increased and the amount of initiator employed is also sufficiently increased, the reaction can be driven to a higher degree of allylic utilization without the formation of gel than in a system containing less solvent.

Organic solvents useful in carrying out the solution polymerization are those which are non-reactive chemically with the monomer and resulting polymer, have a boiling temperature substantially below the monomer, i.e., a higher vapor pressure, so as to be easily separated from the monomer by distillation, and which serve as a solvent for the bisphenol bis(allylic carbonate)-functional monomer and the resulting bisphenol poly(allylic carbonate)-functional prepolymer (and preferably also the initiator). Useful solvents include the halogenated, e.g., chlorinated, $C_1$-$C_2$ hydrocarbon solvents, i.e., methyl chloride, methylene chloride, ethyl chloride, ethylene dichloride, 1,1,2-trichloro-1,2,2-trifluoroethane, and mixtures thereof. Methylene chloride is preferred because of its high vapor pressure, low boiling point and ease of separation.

The amount of solvent used in the partial polymerization process should be sufficient to solubilize all of the monomer and to maintain all of the resulting prepolymer in solution. This is generally from about 0.5 to 5 milliliters of solvent per gram of monomer. Greater amounts of solvent can be used without deleterious effect. Lesser amounts of solvent often result in the formation of an insoluble, infusible, intractable gel when allylic utilizations above about 17 percent are employed.

The concentration of initiator useful for the partial polymerization should be sufficient to result in the desired degree of allylic utilization at the conditions used, and generally can vary from 0.1 to about 1.5 weight percent initiator, basis weight of monomer. Greater amounts of initiator may result in either residual initiator in the product or formation of an infusible, insoluble, intractable gel. The initiators useful in carrying out the solution polymerization of the bisphenol bis(allylic carbonate)-functional monomer are free radical initiators, e.g., organic peroxides and azo catalysts, and are well known in the art. The preferred free radical initiators are organic peroxy compounds, such as peroxyesters, diacyl peroxides peroxydicarbonates and mixtures of such peroxy compounds.

Examples of peroxy compounds include: peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxydicarbonate, dicyclohexyl peroxydicarbonate, di(4-tert-butylcyclohexyl) peroxydicarbonate, and isopropyl sec-butyl peroxydicarbonate; diacetyl peroxides such as diacetyl peroxide, dibenzoyl peroxide, dilauroyl peroxide, and diisobutyryl peroxide; and peroxyesters such as tertiary-butyl perpivalate, tertiary-butyl peroctoate and tertiary-butyl perneodecanoate.

Only one peroxy compound or a mixture of peroxy compounds may be used as desired.

The solution polymerization is generally carried out at temperatures of from about 28° C. to about 100° C., for from about 1 to about 24 hours. The time and temperature depend on the initiator and the concentration thereof, and the solvent:monomer ratio used.

The amount of bisphenol bis(allylic carbonate)-functional material present in the polymerizable, homogeneous composition is susceptible to wide variation. Ordinarily, the bisphenol bis(allylic carbonate)-functional material is present in the polymerizable, homogeneous composition in an amount in the range of from about 40 to 100 percent by weight. In many cases the bisphenol bis(allylic carbonate)-functional material is present in an amount in the range of from about 40 to 100 percent by weight. Often it is present in an amount in the range of from about 50 to about 99.5 percent by weight. An amount in the range of from about 85 to about 99 percent by weight is preferred.

There are many materials which may optionally be present in the polymerizable, homogeneous composition of the present invention.

When, as is preferred, polymerization of the polymerizable composition is initiated by thermally generated free radicals, the polymerizable composition contains initiator. The initiators which may be used in the present invention may be widely varied, but in general they are thermally decomposable to produce radical pairs. One or both members of the radical pair are available to initiate addition polymerization of ethylenically unsaturated groups in the well-known manner.

The preferred initiators are peroxy initiators. Examples of suitable peroxy initiators include those represented by any of the following formulae:

$$R_1OCOOCOR_2 \quad (VI)$$
$$\overset{\parallel}{O} \quad \overset{\parallel}{O}$$

$$R_1OOR_2 \quad (VII)$$

$$R_1COOCR_2 \quad (VIII)$$
$$\overset{\parallel}{O} \quad \overset{\parallel}{O}$$

$$R_1COOR_2 \quad (IX)$$
$$\overset{\parallel}{O}$$

wherein $R_1$ and $R_2$ are each individually phenyl, phenylalkyl in which the alkyl portion is straight or branched and contains from 1 to about 10 carbon atoms, straight alkyl containing from 1 to about 20 carbon atoms, branched alkyl containing from 3 to about 20 carbon atoms, cycloalkyl containing from about 5 to about 12 carbon atoms, or polycycloalkyl containing from about 7 to about 12 carbon atoms. The specific groups used for $R_1$ and $R_2$ may be the same or they may be different.

It is to be understood that unless otherwise qualified, either expressly or contextually, any of the above groups may be substituted with one or more minor substituents so long as their numbers and identities do not render the initiator unsuitable for its intended purpose. Halo groups, alkoxy groups containing from 1 to 4 carbon atoms, and polyhaloalkyl groups containing from 1 to about 4 carbon atoms, are examples of substituents which may be used. Alkyl groups containing from 1 to about 4 carbon atoms may be used as substituents on non-aliphatic groups or on non-aliphatic portions of complex groups.

The phenylalkyl groups used for $R_1$, $R_2$, or both $R_1$ and $R_2$ often contain from 1 to about 4 carbon atoms in the alkyl portion. Benzyl and phenylethyl are preferred.

The branched alkyl groups often have at least one branch in the 1-position or the 2-position. In many cases each branched alkyl group contains from 3 to about 8 carbon atoms. Preferably, each branched alkyl group contains 3 or 5 carbon atoms.

Examples of branched alkyl groups that may be used include isopropyl, secondary butyl, isobutyl, tertiary butyl, 1-methylbutyl, 2-methylbutyl, tertiary pentyl, 1,2-dimethylpropyl, neopentyl, 1-methylpentyl, 2-methylpentyl, 1,1-dimethylbutyl, 1,2-dimethylbutyl, 1,3-dimethylbutyl, 2,2-dimethylbutyl, 1-ethylbutyl, 2-ethylbutyl, 2-ethylhexyl, 2,4,4-trimethylpentyl, and 1-ethyldecyl. Preferred are secondary butyl, tertiary butyl, and neopentyl.

The cycloalkyl often contains from about 5 to about 8 carbon atoms.

Examples of cycloalkyl groups include cyclopentyl, cyclohexyl, cycloheptyl, cyclooctyl, cyclodecyl, and cyclododecyl. Cyclohexyl is preferred.

The polycyclolalkyl typically contains from about 7 to about 10 carbon atoms.

Examples of polycycloalkyl groups that may be used include 1-norbornyl, 2-bornyl, and 1-adamantyl.

Exemplary peroxy initiators include those described above in respect of the preparation of liquid aromatic-containing poly(allyl carbonate) polymer. Diisopropyl peroxydicarbonate and benzoyl peroxide are the preferred initiators.

Other examples of suitable peroxy initiators include monoperoxy carbonates represented by the following formula:

$$R_3-O-O-\overset{\overset{\displaystyle O}{\parallel}}{C}-O-R_4 \quad (X)$$

wherein $R_3$ is a tertiary $C_4$–$C_5$ alkyl, e.g., tertiary butyl and tertiary amyl, and $R_4$ is a $C_3$–$C_7$ alkyl. Examples of alkyl radicals representative of $R_4$ include: isopropyl, n-propyl, isobutyl, secondary butyl, n-butyl, secondary amyl, isoamyl, n-amyl, secondary hexyl, isohexyl, n-hexyl, n-heptyl and 2,4-diemethyl-3-pentyl. Preferred as $R_4$ are secondary $C_3$–$C_7$ alkyls such as isopropyl, secondary butyl, and 2,4-dimethyl-3-pentyl. Particularly preferred monoperoxycarbonates are tertiary-butyl-peroxy isopropyl carbonate and tertiary-amyl-peroxy isopropyl carbonate.

Only one initiator or a plurality of initiators may be used as desired.

When used, the amount of initiator present in the polymerizable, homogeneous composition may be widely varied. Ordinarily the weight ratio of the initiator to all ethylenically unsaturated material present in the composition is in the range of from about 0.5:100 to about 7:100. In many cases the weight ratio is in the range of from about 1:100 to about 5:100. A weight ratio in the range of from about 2:100 to about 4:100 is preferred.

It is to be recognized by those skilled in the art that the most preferred weight ratios of initiator will depend upon the nature of the initiator used (its active oxygen content) as well as the nature and ratios of the various ethylenically unsaturated materials present in the composition.

Polymerizates produced by free-radically polymerizing 4,4'-(1-phenylethylidene)bis[phenol] bis(allyl carbonate) monomer and/or prepolymer have acceptably high hardnesses for ophthalmic applications, but tend to exhibit yellowness. Such polymerizates are satisfactory for some ophthalmic purposes, such as sunglasses, but for most ophthalmic applications polymerizates of lesser yellowness are desired. When it is desired to produce polymerizates of lesser yellowness, the polymerizable, homogeneous composition may comprise cyclohexenic material which comprises at least one cyclohexenic compound represented by the formula:

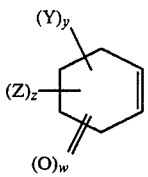

(XI)

in which (a) each Y is independently alkyl containing from 1 to about 4 carbon atoms, (b) Z is hydroxyl, 2-oxoethyl, hydroxyalkyl containing from 1 to about 3 carbon atoms, alkoxycarbonyl containing from 2 to about 5 carbon atoms, or $R_5C(O)OR_6$— in which $R_5$ is alkyl containing from 1 to about 4 carbon atoms and $R_6$ is alkanediyl containing from 2 to about 4 carbon atoms or alkylidene containing from 1 to about 5 carbon atoms, (c) O is oxygen, (d) y is an integer in the range of from 0 to about 3, (e) z is 0 or 1, (f) w is 0 or 1, and (g) the sum of z and w is 0 or 1.

Methyl is the preferred alkyl group used for Y. The groups represented by Y may be the same or they may differ.

When Z is hydroxyalkyl, it is usually hydroxymethyl, 2-hydroxyethyl, or 1-hydroxy-1-methylethyl. When Z is alkoxycarbonyl, it usually contains 2 or 3 carbon atoms. Methoxycarbonyl is preferred. $R_5$ is most often methyl, ethyl or propyl. When $R_6$ is alkanediyl, it may be straight or branched; ethanediyl is preferred. When $R_6$ is alkylidene it is usually methylene or 1-methylethylidene. Preferably y is 0 or 1. Similarly it is preferred that z be 0 or 1. It is also preferred that w be zero.

Examples of cyclohexenic compounds that may be used in the invention include cyclohexene, α-terpineol, terpinen-4-ol, α-terpinyl acetate, α-terpinyl propionate, α-terpinyl butyrate, 1-methyl-1-cyclohexene, 3-methyl-1-cyclohexene, 4-methyl-1-cyclohexene, methyl 1-cyclohexene-1-carboxylate, 3-methyl-2-cyclohexen-1-ol, 3-methyl-2-cyclohexen-1-one, 4-isopropyl-2-cyclohexen-1-one, 3,5-dimethyl-2-cyclohexen-1-one, 4,4-dimethyl-2-cyclohexen-1-one, isophorone, 2,6,6-trimethyl-1-cyclohexene-1-acetaldehyde, and 3,5,5-trimethyl-2-cyclohexen-1-ol. The preferred cyclohexenic compounds are cyclohexene, α-terpinyl acetate, α-terpinyl propionate, and α-terpinyl butyrate. The especially preferred cyclohexenic material is cyclohexene, α-terpinyl acetate, or a mixture thereof.

The amount of cyclohexenic material used in the polymerizable, homogeneous composition may be widely varied. When used, the cyclohexenic material is generally present in the polymerizable, homogeneous composition in an amount in the range of from about 0.1 to about 5 percent by weight. In many cases it is present in an amount in the range of from about 0.5 to about 4 percent by weight. An amount in the range of from about 1 to about 3 percent by weight is preferred.

Non-aromatic bis(allylic carbonate)-functional monomer is a material which can optionally be present in the polymerizable homogeneous compositions of the invention. Such monomer comprises one or more non-aromatic bis(allylic carbonate)-functional monomeric compounds which are bis(allylic carbonates) of linear or branched aliphatic glycols, cycloaliphatic glycols, or glycols containing at least one divalent aliphatic portion and at least one divalent cycloaliphatic portion. These monomers can be prepared by procedures well known in the art, for example, those described in U.S. Pat. Nos. 2,370,567 and 2,403,113, the entire disclosures of which are incorporated herein by reference. In the latter patent, the monomers are prepared by treating the non-aromatic glycol with phosgene at temperatures between 0° C. and 20° C. to form the corresponding bischloroformate. The bischloroformate is then reacted with an unsaturated alcohol in the presence of a suitable acid acceptor, as for example, pyridine, a tertiary amine, or an alkali or alkaline earth metal hydroxide. Alternatively, the unsaturated alcohol can be reacted with phosgene and the resulting chloroformate reacted with the non-aromatic glycol in the presence of an alkaline reagent, as described in U.S. Pat. No. 2,370,567.

The non-aromatic bis(allylic carbonate)-functional monomeric compounds can each be represented by the formula

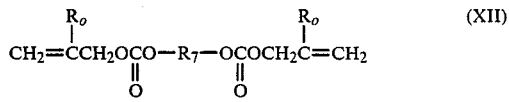

(XII)

in which $R_7$ is the divalent radical derived from the non-aromatic glycol and each $R_o$ is independently hydrogen, halo, or an alkyl group containing from 1 to about 4 carbon atoms. The alkyl group is usually methyl or ethyl. Most commonly both groups represented by $R_o$ are either hydrogen or methyl; hydrogen is preferred.

The aliphatic glycol from which the non-aromatic bis(allylic carbonate)-functional monomeric compounds may be derived, can be linear or branched and contain from 2 to about 10 carbon atoms. Commonly, the aliphatic glycol is an alkylene glycol having from 2 to 4 carbon atoms or a poly($C_2$-$C_4$) alkylene glycol. Examples of such compounds include ethylene glycol, propylene glycol, 1,3-propanediol, 1,4-butanediol, 1,3-butanediol, 1,5-pentanediol, 1,6-hexanediol, 1,8-octanediol, 2-ethyl-hexyl-1,6-diol, 1,10-decanediol, diethylene glycol, triethylene glycol, tetraethylene glycol, $HOCH_2CH_2CH_2OCH_2CH_2CH_2OCH_2CH_2CH_2OH$, dipropylene glycol, tripropylene glycol, and tetrapropylene glycol. Other examples include alkylene carbonate and alkylene ether carbonate diols such as $HOCH_2CH_2O$—$CO$—$OCH_2CH_2OH$ and $HOCH_2CH_2OCH_2$—$CH_2O$—$CO$—$CH_2CH_2CH_2CH_2OH$.

The cycloaliphatic glycols from which the non-aromatic bis(allylic carbonate)-functional monomeric compound may be derived, usually contain from about 5 to about 8 carbon atoms. Ordinarily, the cycloaliphatic glycol contains from about 6 to about 8 carbon atoms. Examples include 1,3-cyclopentanediol, 1,2-cyclohexanediol, 1,3-cyclohexanediol, 1,4-cyclohexanediol and 1,5-cyclooctanediol.

Examples of glycols containing at least one divalent aliphatic portion and at least one cycloaliphatic portion which may be used include 4,4'-methylenebis[cyclohexanol], 4,4'-(methylethylidene)bis[cyclohexanol], 2,2'-(1,4-cyclohexanediyl)bisethanol, and 1,4-cyclohexane dimethanol.

The non-aromatic glycol from which the non-aromatic bis(allylic carbonate)-functional monomeric compound may be derived may also be aliphatic diol-functional chain extended compounds. Examples of such compounds based on alkylene oxide extension include ethylene oxide extended trimethylolpropane, propylene oxide extended trimethylolpropane, ethylene oxide extended glycerol, and propylene oxide extended glycerol.

Preferably, the non-aromatic bis(allylic carbonate)-functional monomeric compound is aliphatic bis(allylic carbonate)-functional monomeric compound. Most commonly, $R_5$ is —$CH_2CH_2$—, —$CH_2CH_2$—O—$CH_2CH_2$—, or —$CH_2CH_2$—O—$CH_2CH_2$—O—$CH_2CH_2$—.

Specific examples of aliphatic bis(allylic carbonate)-functional monomeric compounds useful in the practice of the invention include ethylene glycol bis(2-chloroallyl carbonate), ethylene glycol bis(allyl carbonate), 1,4-butanediol bis(allyl carbonate), 1,5-pentanediol bis(allyl carbonate), 1,6-hexanediol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate, 1,3-butanediol bis (allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

Industrially important aliphatic bis(allyl carbonate)-functional monomeric compounds which can be utilized in the invention herein contemplated are:

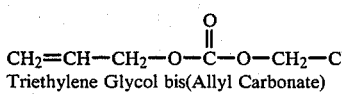
Triethylene Glycol bis(Allyl Carbonate) (XIII)

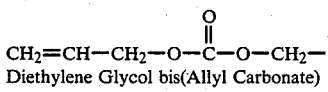
Diethylene Glycol bis(Allyl Carbonate), and (XIV)

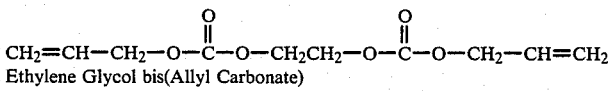
Ethylene Glycol bis(Allyl Carbonate) (XV)

Diethylene glycol bis(allyl carbonate) [CAS 142-22-3] is preferred. Monomer containing this compound is commercially available from PPG Industries, Inc. and is sold under the trademark CR-39 ® Allyl Diglycol Carbonate.

The amount of non-aromatic bis(allylic carbonate)-functional monomer present in the polymerizable homogeneous composition may be widely varied. When it is used, the weight ratio of the non-aromatic bis(allylic carbonate)-functional monomer to all ethylenically unsaturated material present in the composition is ordinarily in the range of from about 0.1:100 to about 20:100. Often the weight ratio is in the range of from about 1:100 to about 15:100. A weight ratio in the range of from about 2:100 to about 10:100 is preferred.

Another material which may optionally be present is non-aromatic poly(allylic carbonate)-functional prepolymer. This material is prepared by partially polymerizing non-aromatic poly(allylic carbonate)-functional monomer to utilize a fraction of the allylic groups without incurring significant gellation. The preferred non-aromatic poly(allylic carbonate)-functional prepolymers are those prepared in accordance with the procedures described in detail in European Patent Publication No. 0 144 782 A2. The preparation is analogous to the preparation of the bisphenol poly(allylic carbonate)-functional prepolymer, except that non-aromatic poly(allylic carbonate)-functional monomer is used rather than bisphenol bis(allylic carbonate)-functional monomer. Following partial polymerization, the solvent in the composition can be removed by known techniques, e.g., by evaporation or distillation, leaving a viscous liquid comprising a solution of non-aromatic poly(allylic carbonate)-functional prepolymer in non-aromatic bis(allyl carbonate)-functional monomer. The solution is typically a pourable, syrupy liquid having a kinematic viscosity (measured with a capillary viscometer) of from at least about 100 centistokes to about 100,000 centistokes, typically from about 1,000 to about 40,000 centistokes, more typically from about 500 to 2,000 centistokes, measured at 25° C., and a bulk density at 25° C. of from about 1.17 to about 1.23 grams per cubic centimeter. The solution is further characterized by having more than 12 percent allylic utilization, preferably from at least 15 to 50 percent allylic utilization, and, in a particularly preferred exemplification, from about 20 to 50 percent allylic utilization, as determined by IR or NMR analysis. IR analysis is preferred.

According to one exemplification, a liquid mixture comprising 100 grams of diethylene glycol bis(allyl carbonate) monomer, 300 milliliters of methylene chloride and 1.1 milliliters of diisopropyl peroxydicarbonate was prepared. The liquid mixture was placed in a bottle and the bottle was purged with argon for 3 minutes. The bottle and its contents were held at 70° C. for 18 hours and then cooled to 25° C. The liquid reaction mixture was placed in a one liter round bottom flask and vacuum stripped at 50° C. for 2 hours. Then the temperature was raised to 60° C. for 1 hour and the pressure lowered until an absolute pressure of 267 pascals was obtained. The residue remaining after vacuum stripping was a solution of aliphatic poly(allyl carbonate)-functional prepolymer in diethylene glycol bis(allyl carbonate) monomer and had a viscosity of 1900 centipoises and an allylic utilization of 34 percent.

The amount of non-aromatic poly(allyl carbonate)-functional prepolymer present in the polymerizable, homogeneous composition may be widely varied. When it is used, the weight ratio of the non-aromatic poly(allyl-carbonate)-functional polymer to all ethylenically unsaturated material present in the composition is ordinarily in the range of from about 0.1:100 to about 20:100. Often the weight ratio is in the range of from about 1:100 to about 15:100. A weight ratio in the range of from about 2:100 to about 10:100 is preferred.

In addition to the bisphenol bis(allylic carbonate)-functional material described above, other bisphenol bis(allylic carbonate)-functional materials (i.e., monomer, prepolymer, or mixtures thereof) may optionally be present in the polymerizable homogeneous compositions of the inventor. There are many such other bisphenol bis(allylic carbonate)-functional materials which are known. Examples of the materials include monomers such as 4,4'-(1-methylethylidene)bis[phenol] bis(allyl carbonate) [CAS 84000-75-9], 4,4'-(1-methylethylidene)bis[2,6-dichlorophenol] bis(allyl carbonate)

[CAS 27961-25-7], and 4,4'-(1-methylethylidene)bis[2,6-dibromophenol] bis(allyl carbonate) [CAS 98572-840]. Prepolymers of the other bisphenol bis(allylic carbonate) monomers may be prepared in accordance with European Patent Publication No. 0 144 782 A2 or U.S. application No. 24,878, filed Mar. 12, 1987 and used in the polymerizable homogeneous compositions of the present invention.

The amount of other bisphenol bis(allylic carbonate)-functional material present in the polymerizable, homogeneous composition of the present invention may vary widely. When it is used, the weight ratio of the other bisphenol bis(allylic carbonate)-functional material to all ethylenically unsaturated material present in the composition is usually in the range of from about 5:100 to about 50:100. Often the weight ratio is in the range of from about 10:100 to about 35:100. A weight ratio in the range of from about 10:100 to about 20:100 is preferred.

Another material that may optionally be present is diester represented by the formula

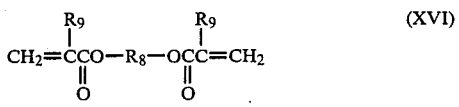

where $R_8$ is a divalent organo group which may be aromatic, non-aromatic, or partially aromatic and partially non-aromatic, and where each $R_9$ is independently hydrogen, halo, or an alkyl group containing from 1 to about 4 carbon atoms. Usually, both groups represented by $R_9$ are either hydrogen or both are methyl. These diesters are esterification products of dihydroxy-functional materials with one or more acrylic acids. They are known compounds and may be prepared by well known procedures.

The amount of the diester present in the polymerizable, homogeneous composition may also be widely varied. When it is used, the weight ratio of the diester to all ethylenically unsaturated material present in the composition is generally in the range of from about 0.1:100 to about 20:100. Typically the weight ratio is in the range of from about 1:100 to about 15:100. A weight ratio in the range of from about 2:100 to about 10:100 is preferred.

Yet another optional material which may be present is monofunctional acrylate represented by the formula

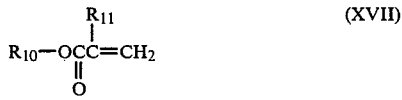

where $R_{10}$ is a monovalent organo group and $R_{11}$ is hydrogen, halo, or an alkyl group containing from 1 to about 4 carbon atoms.

The monofunctional acrylates represented by Formula (XVII) are themselves well known compounds. The monovalent organo group, $R_{10}$ may be aliphatic, cycloaliphatic, aromatic, or a combination of two or more of these properties. Most often $R_{10}$ is alkyl containing from 1 to about 4 carbon atoms, cycloalkyl containing from 5 to about 8 carbon atoms, phenyl, or benzyl. It is preferred that $R_{10}$ be methyl, ethyl, isobutyl cycloalkyl, phenyl, or benzyl. $R_{11}$ is usually hydrogen or methyl. Examples of monofunctional acrylates include: methyl acrylate, methyl methacrylate, ethyl methacrylate, butyl methacrylate, isobutyl methacrylate, cyclohexyl methacrylate, phenyl methacrylate, and benzyl methacrylate. The methacrylic acid esters, as for example isobutyl methacrylate, are preferred.

The amount of monofunctional acrylate present in the polymerizable, homogeneous composition may be varied considerably. When the monofunctional acrylate is used, the weight ratio of the monofunctional acrylate to all ethylenically unsaturated material present in the composition is ordinarily in the range of from about 0.1:100 to about 25:100. Often the weight ratio is in the range of from about 1:100 to about 15:100. A weight ratio in the range of from about 2:100 to about 10:100 is preferred.

One or more ethylenically unsaturated monomers not heretofore discussed may optionally be present in the pourable, polymerizable composition of the invention. Illustrative of such monomers are alkyl esters of ethylenically unsaturated dicarboxylic acids, cycloalkyl esters of ethylenically unsaturated dicarboxylic acids, allyl esters of saturated or ethylenically unsaturated dicarboxylic acids, vinyl esters of saturated monocarboxylic acids, vinyl benzoate, styrene substituted styrene, divinylbenzene, diallylic esters of any of the phthalic acids, tris and higher functional acrylates, tris and higher functional allylic compounds which include tris and higher functional allylic carbonate compounds. It is preferred that the vinyl esters of saturated monocarboxylic acids contain from 4 to about 6 carbon atoms. Vinyl acetate is especially preferred. When used, the weight ratio of these materials to all ethylenically unsaturated material present in the composition is usually in the range of from about 0.1:100 to about 15:100. A weight ratio in the range of from about 0.1:100 to about 10:100 is preferred. When used, the weight ratio of vinyl ester of saturated monocarboxylic acid to all ethylenically unsaturated material present in the composition is usually in the range of from about 0.1:100 to about 15:100; a weight ratio in the range of from about 0.1:100 to about 10:100 is preferred.

Another material which may optionally be present in the polymerizable, homogeneous composition is mold release agent. When used, the mold release agent is employed in the polymerizable composition in amounts sufficient to ensure an intact, that is, unbroken and uncracked, casting which releases easily from the mold. The mold release agent should be compatible with the polymerizable composition and not adversely affect the physical properties of the casting. More particularly, the mold release agent should not adversely affect the physical properties most characteristic of the polymerizate such as its rigidity, hardness, index of optical refraction, transmission of visible light and absence of coloring which affects optical clarity. The mold release agent should, therefore, be a liquid, or, if a solid, be soluble in the polymerizable composition.

Mold release agents that may be used include alkyl phosphates and stearates. Among the alkyl phosphates that may be used as a mold release agent are the mono and dialkyl phosphates (and mixtures of mono and dialkyl phosphates) which are commercially available from E. I. DuPont de Nemours & Co. under the trade names ORTHOLEUM® 162 and ZELEC® UN. These alkyl phosphates are reported to have straight chain alkyl groups of from 16 to 18 carbon atoms.

Other mold release agents that may be used include stearic acid and the metal salts of stearic acid, e.g., stearic acid salts of the metals zinc, calcium, lead, magnesium, barium, cadmium, alminum, and lithium. Other fatty acids and fatty acids salts may also be used, provided that they do not adversely effect the physical properties of the casting. Other mold release agents known to the art may be used.

When used, the mold release agent is ordinarily present in the polymerizable, homogeneous composition in an amount between about 1 and about 2000 parts by weight of mold release agent per million parts by weight of all ethylenically unsaturated material present (PPM). In many cases, between about 20 and about 200 PPM is used. Between about 25 and about 100 PPM is preferred.

Dyes are optional materials that may be present when high transmission of light is not necessary.

Further examples of optional materials that may be present include small amounts of polymerization inhibitors to promote stability during storage and ultraviolet light adsorbers.

The listing of optional ingredients discussed above is by no means exhaustive. These and other ingredients may be employed in their customary amounts for their customary purposes so long as they do not seriously interfere with good polymer formulating practice.

In the polymerizable composition, the ethylenically unsaturated material should be in the form of a solution in the proportions used.

The polymerizable, homogeneous compositions of the invention are usually prepared by admixing the various ingredients. Mixing may be accompanied with heating when it is desirable to hasten dissolution of any of the ingredients. However, if initiator is present during heating, the temperature should ordinarily be maintained below that at which polymerization is initiated. It is preferred to employ heating in the absence of initiator, to cool the resulting solution, and then to introduce the initiator and other ingredients which enter the solution without undue difficulty.

In most cases, the polymerizable, homogeneous compositions of the invention are pourable. The term "pourable" as used herein means the viscosity of the composition is sufficiently low that it can be poured into molds commonly used in casting ophthalmic lenses and lens blanks. The temperature of reference is usually ambient temperature, but in some cases slightly elevated temperatures are employed to reduce the viscosity and facilitate pouring. In those instances where the composition contains free-radical initiator, the temperature should ordinarily be below that at which polymerization is initiated. Ordinarily the viscosity of the material is at least as low as about 6000 centipoises at 25° C. In many cases the viscosity is at least as low as about 2000 centipoises at 25° C. Often the viscosity is at least as low as about 500 centipoises at 25° C. It is preferred that the viscosity be at least as low as about 100 centipoises at 25° C.

The polymerizable, homogenous compositions of the invention can be free-radically polymerized (viz., cured) by the known conventional techniques for polymerizing (allylic carbonate)-containing compositions to form solid, crosslinked polymer.

Preferably, polymerization is accomplished by heating the polymerizable composition to elevated temperatures in the presence of free-radical initiator. Typically polymerization is conducted at temperatures in the range of from about 28° C. to about 100° C. In many cases post curing, that is, heating beyond the time thought necessary to substantially fully polymerize the composition is employed. The post cure is often carried out above about 100° C., but below the temperatures at which thermal degredation provides undesirable yellowness, e.g., about 125° C., and preferably for a time sufficient to attain either substantially constant or maximum Barcol hardness. For example, when the cure cycle shown in Table 2 below is followed, the polymerizate may be maintained at 100° C. for an additional 1 to 4 hours or more. Although not wishing to be bound by any theory, the additional 1 to 4 hours of post cure is believed to decompose, primarily by initiation and chain termination, from 83 percent to 99.9 percent of the peroxide initiator remaining unreacted at the end of the normal 18 hour cure cycle. Moreover, the additional 1 to 4 hours of cure often increase the Barcol hardness by about 5 to 8 units.

In most cases, the polymerizable, homogeneous composition is conformed to the shape of the final solid polymerized article before polymerization. For example, the composition can be poured onto a flat surface and heated, whereby to effect polymerization and form a flat sheet or coating. According to a still further exemplification, the polymerizable composition is placed in molds, as for instance glass molds, and the molds heated to effect polymerization, thereby forming shaped articles such as lens blanks or ophthalmic lenses. In a particularly preferred embodiment, the composition is poured into a lens mold and polymerized therein to produce an ophthalmic lens.

A wide variety of cure cycles, that is, time-temperature sequences, may be used during polymerization. Ordinarily the cure cycle employed is based upon consideration of several factors including the size of the coating, the identity of the initiator, and the reactivity of the ethylenically unsaturated maerial. For casting ophthalmic lenses or lens blanks, several standard cure cycles have been developed and these are shown in Tables 1–4. These standard cure cycles are useful in forming polymerizates according to the present invention, but they are, however, only exemplary, and others may be used.

TABLE 1

Standard Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 18 | 105 (End of Cycle) |

TABLE 2

Standard Eighteen Hour Cure Cycle for Benzoyl Peroxide

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 115 (End of Cycle.) |

TABLE 3

Standard Five Hour Cure Cycle for Benzoyl Peroxide

| Cumulative Hours | Oven Temperature, °C. |
|---|---|
| 0 | 90 |
| 1 | 90 |
| 2 | 90 |
| 3 | 90 |
| 3.5 | 96 |
| 4 | 103 |
| 4.5 | 109 |
| 5 | 115 (End of Cycle.) |

TABLE 4

Standard Cure Cycle for Tertiary-Butylperoxy Isopropyl Carbonate

| Cumulative Hours | Oven Temperature, °C. |
|---|---|
| 0 | 90 |
| 2 | 91 |
| 4 | 92 |
| 6 | 93 |
| 8 | 95 |
| 10 | 97 |
| 12 | 100 |
| 14 | 103 |
| 16 | 110 |
| 17 | 120 (End of Cycle.) |

The polymerizates of the present invention have high refractive indices and 15-second Barcol hardness values which are acceptable for ophthalmic purposes.

The present polymerizates have refractive indices at 20° C. and a wavelength of 589.3 nanometers of at least about 1.57. Often the refractive index under the same conditions is at least about 1.575. Preferably it is at least about 1.58.

The present polymerizates also have 15-second Barcol hardnesses of at least about 15. In many cases the 15-second Barcol hardness is at least about 25, and often it is at least about 35. Preferably the 15-second Barcol hardness is at least about 40. As used herein, 15-second Barcol hardness is determined in accordance with ASTM Test Method D 2583-81 using a Barcol Impressor and taking scale readings 15 seconds from the impressor point has penetrated the specimen.

In many cases the polymerizates of the present invention, on an undyed and untinted basis, also exhibit one or more favorable properties. Among these favorable properties may be mentioned high luminous transmission, low haze, a density of about 1.3 grams per cubic centimeter or lower, and an acceptably low yellowness.

As used herein luminous transmission and haze value are determined on specimens having a thickness of about 2.7 millimeters in accordance with ASTM Test Method D 1003-61 (Reapproved 1977) using a Hunterlab Tristimulus Colorimeter Model D25P employing a collimated Illuminant C standard light source. As the luminous transmission approaches one hundred percent, the difference in luminous transmissions for two samples of the same material but of differing thicknesses approaches zero. Consequently values of luminous transmission of about 85 percent or greater ascertained from samples having thicknesses within about a half millimeter of the 2.7 millimeter standard, approximate reasonably well the luminous transmission at the standard thickness. In similar fashion, haze values of about one percent or less ascertained on samples having thicknesses within about a millimeter of the 2.7 millimeter standard, approximate reasonably well the haze value at the standard thickness. Although the yellowness index seems to vary more with sample thickness than luminous transmission or haze value, nevertheless yellowness indices ascertained from samples having thicknesses within about a half millimeter of the 2.7 millimeter standard do provide a useful general indication of the yellowness index at the standard thickness.

In most cases the luminous transmission of the present polymerizates on an undyed and untinted basis, is at least about 80 percent. Frequently the luminous transmission is at least about 85 percent. Preferably the luminous transmission is at least about 90 percent. When the polymerizate is dyed or tinted for use in sunglasses or filters, the luminous transmission of the dyed and/or tinted, sample is usually at least about 20 percent.

Often the haze value of the polymerizates, on an undyed and untinted basis is about 5 percent or lower. In many cases the haze value is about 2 percent or lower, and preferably it is about 1 percent or lower.

Most of the present polymerizates on an undyed and untinted basis, usually have yellowness indices at a sample thickness of about 2.7 millimeters of about 12 or lower. In many cases the yellowness index is about 4 or lower. Often the yellowness index is about 2.5 or lower. Preferably, the yellowness index is about 1.5 or lower. As used herein, yellowness index is determined on specimens having a thickness of about 2.7 millimeters in accordance with ASTM Test Method D 1925-70 (Reapproved 1977) using a Hunterlab Tristimulus Colorimeter Model D25P employing a collimated Illuminant C standard light source.

The density of most of the polymerizates of the invention is usually about 1.3 grams per cubic centimeter ($g/cm^3$) or lower. Frequently the density is from about 1.27 $g/cm^3$ or lower, and preferably it is about 1.25 $g/cm^3$ or lower. As used herein, density is determined in accordance with ASTM Test Method C729-75 and reported for a temperature of 25° C.

The invention is further described in conjunction with the following examples which are to be considered illustrative rather than limiting, and in which all parts are parts by weight and all percentages are percentages by weight unless otherwise specified.

EXAMPLE I

A 2-liter, 5-necked, jacketed round bottom flask having a valved bottom outlet was equipped with a mechanical stirrer, a water-cooled reflux condenser, an inlet (which could be easily removed to allow the initial charge of reactants) for aqueous sodium hydroxide addition, a thermometer, and a nitrogen purge tube. The flask jacket was connected to a cold water tap.

The flask was purged with nitrogen and then charged with 400 milliliters of methylene chloride, 145.0 grams of 4,4'-(1-phenylethylidene) bis[phenol], 0.2 gram of sodium hydrosulfite, and 127.3 grams of allyl chloroformate. Over a two-hour period and while maintaining the reaction temperature between 20° C. and 30° C., 101.75 grams of 50 percent aqueous sodium hydroxide solution was added with stirring. Upon completion of the addition, the reaction mixture was stirred for 15 minutes. Three hundred milliliters of water then was added to dissolve the salt formed during the reaction. The reaction mixture was stirred briefly and then allowed to settle into two liquid layers which were phase separated. The pH of the aqueous phase was 14. The organic phase was stirred with 300 milliliters of 7.5 percent aqueous sodium hydroxide solution for 30 minutes. The mixture was allowed to settle into two liquid layers which were phase separated. The pH of the aqueous phase was 14. The organic phase was stirred with 300 milliliters of water for 10 minutes. The mixture was allowed to settle into two liquid layers which were phase separated. The pH of the aqueous phase was 8. The organic phase was stirred with a further 300 milliliters of water for 10 minutes. The mixture was allowed to settle into two liquid layers which were phase separated. The pH of the aqueous phase was 6. Solvent was removed from the organic phase under vacuum in a rotary evaporator to provide 4,4'-(1-phenylethylidene)-bis[phenol] bis(allyl carbonate) monomer weighing 223.3 grams.

EXAMPLE II

A casting solution was formed by admixing 25 grams of the 4,4'-(1-phenylethylidene)bis[phenol] bis(allyl carbonate) monomer produced in Example I and 0.70 gram of diisopropyl peroxydicarbonate.

A glass mold was constructed of the two glass sheets separated by a pliable gasket. The glass mold was held together by large binder clips. The pliable gasket prior to compression was about 2.84 millimeters thick.

After filling the mold with a portion of the casting solution, it was placed in a hot air oven and exposed to the Standard Cure Cycle for Diisopropyl Peroxydicarbonate of Table 1. When the cure cycle was completed, the mold was removed from the oven and allowed to cool to about 80° C. The resulting polymerizate was then removed from the mold and was found to be about 2.80 millimeters thick. Various properties of the polymerizate are shown in Table 5.

TABLE 5

| Barcol Hardness | |
|---|---|
| 0-second | 53 |
| 15-seconds | 52 |
| Refractive Index, $n_D^{20}$ | 1.5844 |
| Abbe Number | 30.0 |
| Yellowness Index (2.80 mm thickness) | 11.1 |
| Luminous Transmission, percent (2.80 mm thickness) | 88.9 |
| Haze Value, percent (2.80 mm thickness) | 0.2 |
| Density, g/cc at 25° C. | 1.224 |

EXAMPLE III

A casting solution was formed by admixing 25.48 grams of the 4,4'-(1-phenylethylidene)bis [phenol] bis-(allyl carbonate) monomer produced in Example I, 0.39 gram of α-terpinyl acetate, 0.13 gram of cyclohexene, and 0.73 gram of diisopropyl peroxydicarbonate. A sheet of polymerizate was prepared from the casting solution according to the procedure of Example II. The polymerizate was found to be about 2.72 millimeters thick. Various properties of the polymerizate are shown in Table 6.

TABLE 6

| Barcol Hardness | |
|---|---|
| 0-second | 48 |
| 15-seconds | 48 |
| Refractive Index, $n_D^{20}$ | 1.5848 |
| Abbe Number | 30.1 |
| Yellowness Index (2.72 mm thickness) | 1.1 |
| Luminous Transmission, percent (2.72 mm thickness) | 91.6 |
| Haze Value, percent (2.72 mm thickness) | 0.5 |

TABLE 6-continued

| | |
|---|---|
| Density, g/cc at 25° C. | 1.220 |

EXAMPLE IV

A casting solution was formed and a sheet of polymerizate was prepared from the casting solution according to the procedures of Example III. The thickness of the polymerizate was not measured, but would be expected to be about the same as that of the polymerizate of Example III. Various properties of the polymerizate of this Example are shown in Table 7.

TABLE 7

| Barcol Hardness | |
|---|---|
| 0-second | 49 |
| 15-seconds | 49 |
| Refractive Index, $n_D^{20}$ | 1.5832 |
| Yellowness Index | 1.3 |
| Luminous Transmission, percent | 92.1 |
| Haze Value, percent | 0.2 |
| Density, g/cc at 25° C. | 1.211 |

Although the present invention has been described with reference to specific details of certain embodiments thereof, it is not intended that such details should be regarded as limitations upon the scope of the invention except insofar as they are included in the accompanying claims.

I claim:

1. 4,4'-(1-phenylethylidene)bis[phenol] bis(allyl carbonate).

2. A polymerizable, homogeneous composition comprising bisphenol bis(allylic carbonate)-functional material comprising
   (a) 4,4-(1-phenylethylidene)bis[phenol]bis(allyl carbonate) monomer,
   (b) prepolymer of said monomer, or
   (c) a mixture thereof.

3. The polymerizable, homogeneous composition of claim 2 which additionally comprises peroxy initiator.

4. The polymerizable, homogeneous composition of claim 3 wherein said peroxy initiator is benzoyl peroxide.

5. The polymerizable, homogeneous composition of claim 3 wherein said peroxy initiator is diisopropyl peroxydicarbonate.

6. The polymerizable, homogeneous composition of claim 2 which additionally comprises cyclohexenic material which comprises at least one cyclohexenic compound represented by the formula:

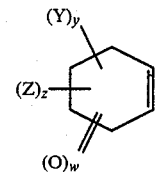

in which
   (a) each Y is independently alkyl containing from 1 to about 4 carbon atoms;
   (b) Z is hydroxyl, 2-oxoethyl, alkoxycarbonyl containing from 2 to about 5 carbon atoms, or $R_3C(O)OR_4$— in which $R_3$ is alkyl containing from 1 to about 4 carbon atoms and $R_4$ is alkanediyl containing from 2 to about 4 carbon atoms or alkylidene containing from 1 to about 5 carbon atoms;

(c) O is oxygen;
(d) y is an integer in the range of from 0 to about 3;
(e) z is 0 to 1;
(f) w is 0 or 1; and
(g) the sum of z and w is 0 or 1.

7. The polymerizable, homogeneous composition of claim 6 wherein said cyclohexenic material comprises at least one cyclohexenic compound selected from the group consisting of cyclohexene, α-terpinyl acetate, α-terpinyl propionate, and α-terpinyl butyrate.

8. The polymerizable, homogeneous composition of claim 6 wherein said cyclohexenic material is cyclohexene, α-terpinyl acetate, or a mixture thereof.

9. The polymerizable, homogeneous composition of claim 6 wherein said bisphenol bis(allylic carbonate)-funcitonal material is present in an amount in the range of from about 40 to about 99.9 percent by weight, and wherein said cyclohexenic material is present in an amount in the range of from about 0.1 to about 5 percent by weight.

10. The polymerizable, homogeneous composition of claim 6 which additionally comprises peroxy initiator.

11. The polymerizable, homogeneous composition of claim 6 wherein said bisphenol bis(allylic carbonate)-functional material comprises 4,4'-(1-phenylethylidene)-bis[phenol] bis(allyl carbonate) monomer and wherein said cyclohexenic material comprises cyclohexene, α-terpinyl acetate, or a mixture thereof.

12. The polymerizable, homogeneous composition of claim 11 wherein:

(a) said 4,4'-(1-phenylethylidene)bis[phenol] bis(allyl carbonate) monomer is present in an amount in the range of from about 85 to about 99 percent by weight;
(b) said cyclohexenic material is present in an amount in the range of from about 1 to about 3 percent by weight.

13. The polymerizable, homogeneous composition of claim 11 which additionally comprises peroxy initiator.

14. The polymerizable, homogeneous composition of claim 13 wherein said peroxy initiator is benzoyl peroxide.

15. The polymerizable, homogeneous composition of claim 13 wherein said peroxy initiator is diisopropyl peroxydicarbonate.

16. The polymerizate produced by free-radically polymerizing the polymerizable, homogeneous composition of claim 2, said polymerizate having a 15-second Barcol hardness of at least about 15 and a refractive index at 20° C. and a wavelength of 589.3 nanometers of at least about 1.57.

17. The polymerizate produced by free-radically polymerizing the polymerizable, homogeneous composition of claim 3, said polymerizate having a 15-second Barcol hardness of at least about 15 and a refractive index at 20° C. and a wavelength of 589.3 nanometers of at least about 1.57.

18. The polymerizate produced by free-radically polymerizing the polymerizable, homogeneous composition of claim 4, said polymerizate having a 15-second Barcol hardness of at least about 15 and a refractive index at 20° C. and a wavelength of 589.3 nanometers of at least about 1.57.

19. The polymerizate produced by free-radically polymerizing the polymerizable, homogeneous composition of claim 5, said polymerizate having a 15-second Barcol hardness of at least about 15 and a refractive index at 20° C. and a wavelength of 589.3 nanometers of at least about 1.57.

20. The polymerizate produced by free-radically polymerizing the polymerizable, homogeneous composition of claim 6, said polymerizate having a 15-second Barcol hardness of at least about 15 and a refractive index at 20° C. and a wavelength of 589.3 nanometers of at least about 1.57.

21. The polymerizate produced by free-radically polymerizing the polymerizable, homogeneous composition of claim 7, said polymerizate having a 15-second Barcol hardness of at least about 15 and a refractive index at 20° C. and a wavelength of 589.3 nanometers of at least about 1.57.

22. The polymerizate produced by free-radically polymerizing the polymerizable, homogeneous composition of claim 8, said polymerizate having a 15-second Barcol hardness of at least about 15 and a refractive index at 20° C. and a wavelength of 589.3 nanometers of at least about 1.57.

23. The polymerizate produced by free-radically polymerizing the polymerizable, homogeneous composition of claim 9, said polymerizate having a 15-second Barcol hardness of at least about 15 and a refractive index at 20° C. and a wavelength of 589.3 nanometers of at least about 1.57.

24. The polymerizate produced by free-radically polymerizing the polymerizable, homogeneous composition of claim 10, said polymerizate having a 15-second Barcol hardness of at least about 15 and a refractive index at 20° C. and a wavelength of 589.3 nanometers of at least about 1.57.

25. The polymerizate produced by free-radically polymerizing the polymerizable, homogeneous composition of claim 11 said polymerizate having a 15-second Barcol hardness of at least about 15 and a refractive index at 20° C. and a wavelength of 589.3 nanometers of at least about 1.57.

26. The polymerizate produced by free-radically polymerizing the polymerizable, homogeneous composition of claim 12, said polymerizate having a 15-second Barcol hardness of at least about 15 and a refractive index at 20° C. and a wavelength of 589.3 nanometers of at least about 1.57.

27. The polymerizate produced by free-radically polymerizing the polymerizable, homogeneous composition of claim 13, said polymerizate having a 15-second Barcol hardness of at least about 15 and a refractive index at 20° C. and a wavelength of 589.3 nanometers of at least about 1.57.

28. The polymerizate produced by free-radically polymerizing the polymerizable, homogeneous composition of claim 14, said polymerizate having a 15-second Barcol hardness of at least about 15 and a refractive index at 20° C. and a wavelength of 589.3 nanometers of at least about 1.57.

29. The polymerizate produced by free-radically polymerizing the polymerizable, homogeneous composition of claim 15, said polymerizate having a 15-second Barcol hardness of at least about 15 and a refractive index at 20° C. and a wavelength of 589.3 nanometers of at least about 1.57.

* * * * *